(12) United States Patent
Huynh (10) Patent No.: US 10,669,180 B2
(45) Date of Patent: Jun. 2, 2020

(54) ADAPTIVE CATALYTIC TECHNOLOGY WATER TREATMENT SYSTEM

(71) Applicant: Huy V. Huynh, Johns Creek, GA (US)

(72) Inventor: Huy V. Huynh, Johns Creek, GA (US)

(73) Assignee: ADAPTIVE CATALYTIC TECHNOLOGY, LLC, Alpharetta, GA (US)

(*) Notice: Subject to any disclaimer, the term of this patent is extended or adjusted under 35 U.S.C. 154(b) by 468 days.

(21) Appl. No.: 15/441,192

(22) Filed: Feb. 23, 2017

(65) Prior Publication Data

US 2017/0313611 A1    Nov. 2, 2017

Related U.S. Application Data

(60) Provisional application No. 62/329,655, filed on Apr. 29, 2016.

(51) Int. Cl.
*C02F 9/00* (2006.01)
*C02F 1/50* (2006.01)
(Continued)

(52) U.S. Cl.
CPC .............. *C02F 9/005* (2013.01); *C02F 1/001* (2013.01); *C02F 1/32* (2013.01); *C02F 1/42* (2013.01); *C02F 1/4602* (2013.01); *C02F 1/505* (2013.01); *C02F 1/722* (2013.01); *C02F 1/74* (2013.01); *C02F 1/76* (2013.01); *C02F 2201/007* (2013.01); *C02F 2209/005* (2013.01); *C02F 2209/01* (2013.01); *C02F 2209/02* (2013.01); *C02F 2209/04* (2013.01);
(Continued)

(58) Field of Classification Search
None
See application file for complete search history.

(56) References Cited

U.S. PATENT DOCUMENTS

| | | |
|---|---|---|
| 2005/0161408 A1 | 7/2005 | Costa |
| 2006/0032803 A1 | 2/2006 | Costa |
| 2006/0162806 A1 | 7/2006 | Hengsperger |
| 2008/0105620 A1 | 5/2008 | Hicks |
| 2009/0173616 A1 | 7/2009 | Cabados |
| 2009/0242485 A1 | 10/2009 | Cabados |
| 2011/0180395 A1 | 7/2011 | Tucker |
| 2011/0210077 A1 | 9/2011 | Coulter |

(Continued)

FOREIGN PATENT DOCUMENTS

RU    2590543 C1 *   7/2016

*Primary Examiner* — Cameron J Allen
(74) *Attorney, Agent, or Firm* — Crose Law LLC; Bradley D. Crose (57) ABSTRACT

This Adaptive Catalytic Technology (ACT) water treatment invention uses a series of integrated sequential modular advanced technologies to treat and eliminate or reduce suspended solids, hardness, heavy metals, organic compounds and microorganisms and to provide good tasting chlorine-free sanitized drinking water. The advanced technologies used herein are specifically designed to provide synergistic benefits that minimizes power consumption while improving the overall treatment effectiveness, making it possible to provide a cost effective and sustainable ACT water treatment for point of use drinking water supply for remote or developing areas, as well as residential, commercial, and industrial applications. The advanced technologies employed are environmentally friendly and safe. Specifically, the ACT water treatment invention does not require hazardous chemicals that need special handling to operate or maintain and it does not produce a waste stream or generates disinfection by-products (DBPs), such as, trihalomethanes (THMs) or haloacetic acids (HAAs).

17 Claims, 6 Drawing Sheets

(51) Int. Cl.
*C02F 1/32* (2006.01)
*C02F 1/74* (2006.01)
*C02F 1/72* (2006.01)
*C02F 1/42* (2006.01)
*C02F 1/76* (2006.01)
*C02F 1/46* (2006.01)
*C02F 1/00* (2006.01)

(52) U.S. Cl.
CPC ...... *C02F 2209/05* (2013.01); *C02F 2209/06* (2013.01); *C02F 2209/11* (2013.01); *C02F 2209/22* (2013.01); *C02F 2209/40* (2013.01); *C02F 2303/04* (2013.01); *C02F 2303/20* (2013.01); *C02F 2305/023* (2013.01); *C02F 2305/10* (2013.01); *Y02W 10/33* (2015.05); *Y02W 10/37* (2015.05)

(56) References Cited

U.S. PATENT DOCUMENTS

| | | |
|---|---|---|
| 2011/0210266 A1 | 9/2011 | Coulter |
| 2011/0210267 A1 | 9/2011 | Coulter |
| 2011/0243789 A1 | 10/2011 | Roberts |
| 2012/0111803 A1 | 5/2012 | Daniely |
| 2013/0186835 A1 | 7/2013 | Coulter |
| 2013/0284647 A1 | 10/2013 | Briscoe |
| 2014/0053580 A1 | 2/2014 | Ferreira |
| 2014/0110339 A1 | 4/2014 | Mukhopadhyay |
| 2014/0183107 A1 | 7/2014 | Meunier |
| 2014/0193294 A1 | 7/2014 | Kain |
| 2014/0255565 A1 | 9/2014 | Harvey |
| 2014/0271354 A1 | 9/2014 | Tsai |
| 2014/0319374 A1 | 10/2014 | Chandler |
| 2014/0356229 A1 | 12/2014 | Farren |
| 2016/0024667 A1 | 1/2016 | Shanahan |
| 2016/0068393 A1 | 3/2016 | Doona |

\* cited by examiner

ADAPTIVE CATALYTIC TECHNOLOGY WATER TREATMENT SYSTEM

CROSS-REFERENCE TO RELATED APPLICATION(S)

The present non-provisional patent application claims the benefit of the priority of U.S. Provisional Patent Application No. 62/329,655, which is entitled "ADAPTIVE CATALYTIC TECHNOLOGY WATER TREATMENT SYSTEM", which was filed on Apr. 29, 2016, and which is incorporated in full by reference herein.

FIELD OF THE INVENTION

The ACT water treatment invention relates to a novel process for treating drinking water wherein a series of green and sustainable technologies are employed to treat, remove or reduce suspended solids, microorganisms (e.g., bacteria, spores, viruses, fungi, protozoa, oocysts), heavy metals (e.g., arsenic, cadmium, chromium, lead and mercury), total organic carbons, and maintain a sanitary supply of potable water without using a chemical disinfectant at the point-of-use for rural and remote users, as well as residential and commercial users. The ACT water treatment invention does not require large equipment nor costly initial capital investment (e.g., ozone generator and in-situ electrolysis of hypochlorous acid reactor); hazardous chemicals (e.g., oxidizers, acids and bases) that are difficult to transport, store, handle, or dispose of safely; produces a waste stream (e.g., reverse osmosis and in-situ electrolysis of hypochlorous acid reactor). The ACT water treatment invention does not produce disinfection by products, such as, trihalomethanes (THMs) or haloacetic acids (HAAs) from inexpensive oxidizers, such as, chlorine gas, sodium hypochlorite, calcium hypochlorite, chlorine dioxide, or bromine. Moreover, The ACT water treatment invention provides a sustainable water treatment process for long term use and consumption using common household electricity (110-240 V). More in particular, because of the low electrical power consumption, the ACT water treatment invention can be power by electricity generated by solar, water or wind power for remote and rural applications. Finally, the ACT water treatment invention provides a comprehensive and cost effective solution for point-of-use potable water than the personal and household water treatment devices currently available on the market.

BACKGROUND OF THE INVENTION

The standard drinking water treatment technologies commonly used today are classified broadly into five categories, 1-filtration: classical filtration (US Patent Application 20060162806, "Drinking Water Pitcher Having a Removable Upper Reservoir"), reverse osmosis (RO) and flocculation chemical treatment/settling); 2-adsoprtion: activated carbon and ion-exchange; 3-chemical oxidation: chlorine, chlorine dioxide (US Patent Application 20160068393, "Process for the Generation of Chlorine Dioxide"), in-situ hypochlorous acid (US Patent Application 2011018035, "Advanced Chlorine Generating System") sodium hypochlorite, calcium hypochlorite, bromine, ozone and hydrogen peroxide; 4-irradiation: UV, plasma & actinic radiation; and 5-Distillation. Classical filtration, RO, chemical oxidation, adsorption, and radiation are employed commercially for point-of-use water treatment technologies with significant limitations, and where they are discussed in greater details below. A number of technologies are employed for large scale water works where economy of scale can justify the high capital investment, maintenance, infrastructure, and support services (quality assurance/quality control, hazardous material handling, waste disposal, et cetera), the scope and scale of which are not practical for the point of use water treatment process of the ACT water treatment invention.

Micro filtration is effective in removing suspended solids (SS) and microorganisms; however, media blinding from the SS and bio-film formation are problematic. This technology is simple to use, but it is expensive to operate due to the limited life span of the filter media due to blinding. In addition, this technology does not treat naturally dissolved organic carbons, toxic organic by-products, and potentially harmful industrial and pharmaceutical organic compounds. Another limitation of this technology is that it does not treat and remove ionic form of heavy metals. Finally, this technology does not sanitize the water, hence a disinfectant is needed to preserve the filtered water from microbial growth.

RO technology is also commercially available for point-of-use processes as described in US Patent Application 20140183107, "Portable Power Generation and Pressurized Water Filtration Unit," and US Patent Application 20140110339, "Method for High Efficiency Reverse Osmosis Operation." However, membrane blinding, large power consumption requirement (high water pressure to overcome the osmonic pressure across a semipermeable membrane), and waste (concentrate water rejection ranges from 20% for new, clean membrane to over 50% for fouled membrane), and hazardous chemicals for clean-in-place process, make it expensive to operate and maintain. RO technology does offer an advantage over micro filtration in that it removes dissolved organic compounds; however, it does not treat and remove ionic heavy metals. Finally, this technology does not sanitize the water, hence a disinfectant is needed to preserve the filtered water from microbial growth.

Adsorption technologies are available commercially, activated carbon media to remove organic compounds, and ion-exchange resin to remove heavy metals. Adsorption is practical for low ppm levels of organic compounds and dissolved ions are described in US Patent Application 20080105620, "Water Purification." For activated carbon, the efficiency of the media decrease as the active sites are used up or blocked by the SS; consequently, this technology is commonly used in refrigerated water filtration where a high level of water quality is already met. For ion-exchange resin, the efficiency of the media decrease as the active sites are used up by not only by the heavy metals but other naturally present ions (e.g., calcium, manganese, iron, copper, et cetera). Finally, unless the water is sanitized, biofilm formation blocks the active sites, reducing the effectiveness and efficiency of the adsorption bed. The unit cost of treating the water is high due to the operating cost of media replacement. Finally, since the performance of the media is a function of the concentration of the contaminants and flow rate, breakthrough could occur without the end user being aware of it unless the water is analyzed.

UV radiation is effective for disrupting the DNA of microorganisms, inhibiting but not necessarily destroy them. Microorganisms are able to repair and regenerate when the UV radiation source is removed. This technology is employed commercially in drinking water dispensing tanks to limit bacterial growth, US Patent Application 20090242485, "Purified Water Dispensing Machine," and US Application 20090173616, "Water Ionizing System." It is also used extensively in the aqua-cultural industry to continuous control and limit microbial growth. US Patent Application 20140356229, UV Devices, System and Methods for UV Sterilization," and US Patent 20130175460, "Compositions and Methods for UV Sterilization," US Patent Application 20120235050, "Ultraviolet Irradiation System," broadly describes the art of using UV for disinfection and sterilization of a container, room, space or defined environment. US Patent Application 20140319374, "Portable Ultraviolet Pulse Oximeter Sanitizer," and US Patent Application 20110243789, "Flexible Ultraviolet LED Sanitizing Apparatus," referenced the use of UV radiation in sterilization of drinking water and wastewater. One significant limitation of UV radiation alone is that it is not sufficient to destroy organic compounds, such as, naturally dissolved organic carbons, toxic organic by-products, and potentially harmful industrial and pharmaceutical organic compounds. The emerging field of advanced oxidation using UV-PhotoCatalyst in recent years has been promising in treating organic compounds. UV-Photo Catalyst produces hydroxyl radicals, a strong oxidizer that react with organic compounds, reducing the organic compounds to simpler, less toxic compounds. For large, complex and stable organic compounds, the addition of hydrogen peroxide to a UV-Photo Catalyst system is needed. The photo catalyst process reported in technical literatures were developed as nano size or micron size particles in a fluidized bed reactor, making this technology impractical and expensive to operate since the photo catalyst has to be filtered and recovered, or disposed. Finally, a UV/UV-PhotoCatalyst or UV-Photo-Catalyst/Peroxide system cannot treat and remove heavy metals and SS.

The use of high energy plasma for killing or deactivating bacteria is effective, US Patent Application 20140271354, "Methods and Solutions for Killing or Deactivating Bacteria." The primary drawback with this technology is the power consumption for generating the high energy plasma. Similar to a UV system, a plasma system cannot treat and remove organic carbon, heavy metals and SS.

Actinic radiation is effective and is used to treat ultrapure water, US Patent Application 20130186835, "Method and System for Providing Ultrapure Water," US Patent Application 20110210266, "Method of Irradiating a Liquid," US Patent Application 20110210267, "Actinic Radiation Reactor," US Patent Application 20110210077, "Method and System for Providing Ultrapure Water." While this technology is used in the semiconductor industry, it is not safe or practical for drinking water given the secondary treatment step to destroy the free radical.

Chemical oxidation is an effective approach to sanitize the water by killing microorganisms. Innovation in this field continues to be a significant development: US Patent Application 20160068393, "Process for the Generation of Chlorine Dioxide," US Patent Application 20160024667, "Electrochemical Activation of Water," US Patent Application 20140360948, "Device and Method for Sanitizing Surfaces and Treating Water Using Ozone," US Patent Application 20140255565, "Methods of Using Solutions of Hypobromite to Treat Poultry in a Chill Tank During Processing to Increase the Weight of Poultry," US Patent Application 20140193294, "Ozone Sanitizing System," US Patent Application 20130284647, "Water Treatment System," US Patent Application 20060032803, "Method and Apparatus for Purifying Water," US Patent Application 20050161408, "Method and Apparatus for Purifying Water," and US Patent Application 2012011803, "Water Filter-Pitcher."

Distillation is economical and practical for large commercial facility, employing the evaporation of water and consequently condensation the water vapor. Significant energy is needed to evaporate water (heat of vaporization 2257 kJ/kg). This process is economically feasible when there is an abundant of waste heat and/or natural source of cooling. US Patent Application 20140053580, "Systems and Methods for Potable Water Production," employs the use of a refrigerant to collect and condense moisture in the air. The primary limitation of this approach is the energy requires to operate a refrigerant compressor. However, this technology has the distinct advantage for removing heavy metals and SS, and some organic carbons. A mean of sanitizing the collected water is still required.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

Through a series of novel and innovative technologies, specifically designed to address all of the requirements for providing clean drinking water while addressing all of the barriers and limitations described above, this invention is a comprehensive ACT water treatment that is cost effective and sustainable point-of-use water treatment process. Clean drinking water, a basic requirement to support life and promote a healthy quality of life, is greatly needed in developing countries to address diseases and illnesses caused by contaminated water, and in some cases, lead to contagion and death. In order to provide a cost-effective solution for remote and rural areas in particular, the technologies employ must have a small energy foot print such that it can be powered by solar, water, or wind energy. The need for clean drinking water is just as critical for developed countries where the present of heavy metals leaching from lead soldered copper piping in some locations are becoming a concern; infiltration of suspended solids and microorganisms due to an aging water distribution network in some regions; disinfection by products such as trihalomethanes and haloacetic acids that are formed as a result of the sanitization process using inexpensive oxidizers, such as, chlorine gas, sodium hypochlorite, calcium hypochlorite, chlorine dioxide, or bromine; and trace industrial and pharmaceutical organic compounds that may be present in river water intake sources due to their stability and large loading from a generally higher population density of large urban areas.

The ACT water treatment of this invention uses a series of integrated, sequential modular advanced technologies to treat, and eliminate or reduce suspended solids, hardness, heavy metals, organic compounds and microorganisms, and to provide a chlorine freed, sanitized drinking water that is good tasting. The advanced technologies employ in the ACT water treatment invention are specifically designed to provide synergistic benefits that minimizes power consumption while improving the overall treatment effectiveness, making it possible to provide a cost effective and sustainable ACT water treatment for point of use drinking water supply for remote or developing areas, as well as residential, commercial and industrial applications. The advanced technologies employ in the ACT water treatment invention is environmentally friendly and safe. More specifically, this ACT water treatment invention does not require hazardous chemicals that require special handlings to operate or maintain, produce a waste stream, or produce disinfection by-products. Finally, the application of advanced photo oxidation using proprietary catalysts makes it possible for the ACT water treatment to operate off the grid using solar, water, or wind energy.

Figures 1A, 1B, 1C, 1D:
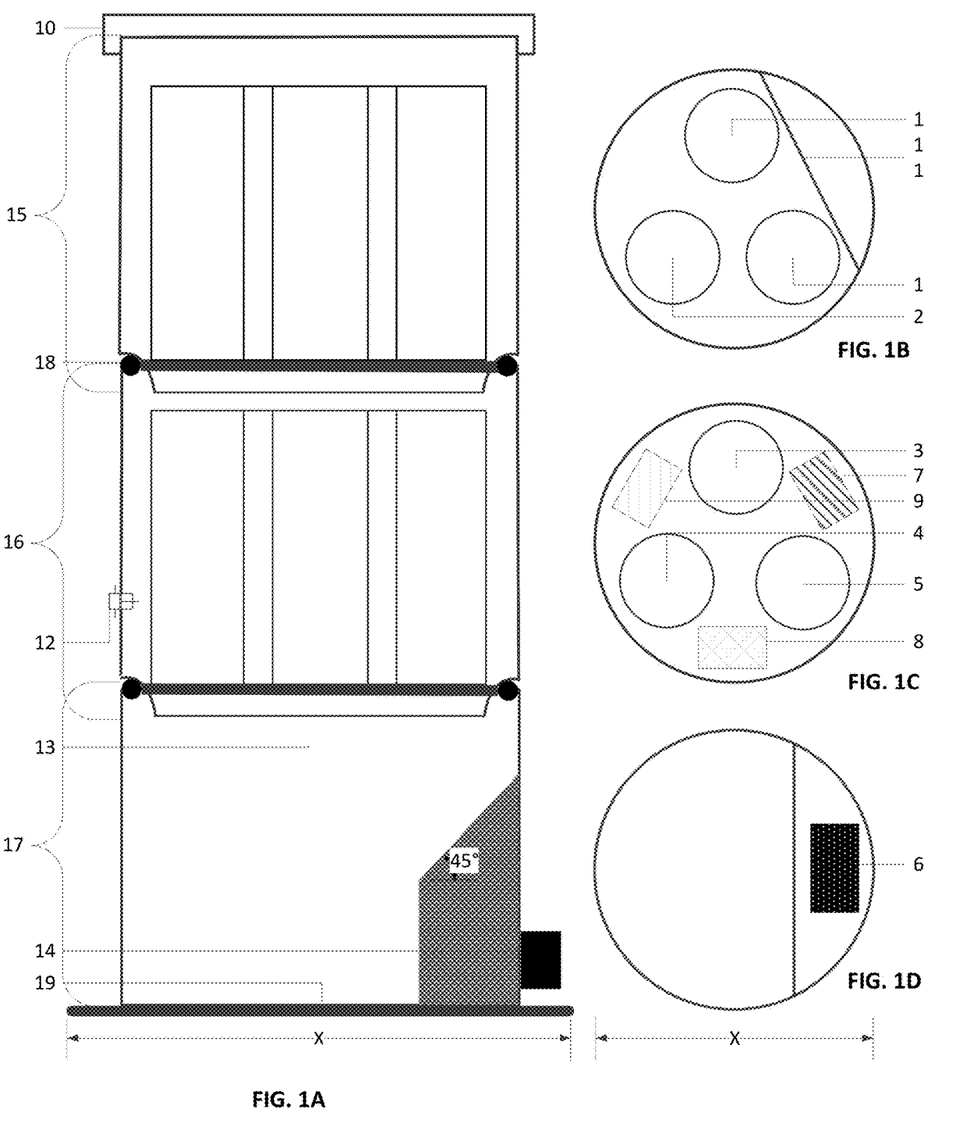
FIG. 1A is a schematic view of a water treatment device, illustrating, in particular, the gravity flow water treatment layout, and its three primary sections: Section I, the incoming water storage and pre-treatment chamber; Section II, the primary treatment, electrical, and instrumentation and control chamber; and Section III, the the sanitary water storage and rapid mix aeration chamber, according to an embodiment of the technology described herein.
FIG. 1B is a cross-sectional view of Section I, the incoming water storage and pre-treatment chamber, according to an embodiment of the technology described herein.
FIG. 1C is a cross-sectional view of Section II, the primary treatment, electrical, and instrumentation and control chamber, according to an embodiment of the technology described herein.
FIG. 1D is a cross-sectional view of Section III, the sanitary water storage and rapid mix aeration chamber, according to an embodiment of the technology described herein.

In at least one exemplary embodiment, an adaptive catalytic technology water treatment system consists of a six-stage plug-and-go modular treatment system: Suspended Solid (SS) Removal via filtration (FIG. 1-1); Hardness Reduction via electrochemical deposition and crystallization of $CaCO_3$ (FIG. 1-2); Total Organic Carbon (TOC) Removal via UVC-PhotoCatalystAlpha/Peroxide (FIG. 1-3); Heavy Metal Removal via ion-exchange (FIG. 1-4); Sanitization via UVA-PhotoCatalystBeta (FIG. 1-5); and Ultra-sound Rapid Mix Aeration (FIG. 1-6).

In at least one embodiment of the adaptive catalytic technology water treatment system, the first stage of the ACT water treatment utilizes a ceramic-silver composite filter (Module 1), which is designed to remove suspended solids (SS) of both inorganic and naturally occurring organic matters (FIG. 1-1). Removing the SS enhances the performance of the subsequent stages of the treatment process. The motive forces for filtration are the hydraulic pressure of the water and the gravitation flow aided by the hydrogen bonding of water molecules themselves; however, a pressurized water source can also be used. The ceramic filter is designed to be removable.

In at least one embodiment, the adaptive catalytic technology water treatment system further includes in the first stage a composite filter that contains silver affixed to the ceramic membrane matrix. Silver is a metal that exhibit natural antimicrobial and antibacterial properties, which is used to minimize fouling and plugging due to biofilm formation. Titanium, zinc, copper, palladium and platinum may also be used in conjunction with silver in any combinations, concentrations or particle sizes. Nano particle size is most effective and is preferred, however, micron size or larger particles can also be used. These metals can be in the form of elemental metal, metal oxide, inorganic metal complexes or organometallic salts.

In at least one embodiment, the adaptive catalytic technology water treatment system further includes in the first stage a composite filter that is designed and constructed so that the external layer of the cartridge can be incrementally removed periodically to eliminate media blinding from calcination and/or the accumulation of solids.

In at least one embodiment of the adaptive catalytic technology water treatment system, the second stage of the ACT water treatment utilizes electrochemical treatment step (Module 2) to remove hardness from the water, thus enhancing the efficacy of the TOC removal treatment step of UVC-PhotoCatalystAlpha/Peroxide (Module 3) and the Sanitization treatment step of UVA-PhotoCatalystBeta (Module 5), and reduce the ionic metal loading of the ion-exchange resin bed (Module 4).

In at least one embodiment, the adaptive catalytic technology water treatment system further includes in the second stage the step wherein the calcium ions are removed from the water through electrochemical deposition and crystallization of calcium carbonate ($CaCO_3$) onto the surface of CatalystGamma fixed bed electrodes when a current is applied. The CatalystGamma fixed bed electrode comprises of a proprietary catalyst containing one or more of the following: Carbon steel, copper, bronze, stainless steel, and platinum. The concentrations of these materials may vary from trace ppm levels to 100%. Any combinations of these metal oxides may be used. The metal oxides can be affixed to a substrate as nano (1-100 nanometer) or micron (greater than 100 nanometer) particles, or as heterogeneous solids. The CatalystGamma fixed bed electrode is made by fusing the referenced materials into a composite solid mass by mean of pressure and heat or an inert binder. The UV-Peroxide requires much higher dosage of peroxide than a UVC-PhotoCatalystAlpha/Peroxide in this process. The electrodes can be of any shapes or sizes. The electrodes can be a pair of anode and cathode or multiple pairs. The gap between electrodes can vary between 100 micron and 100 millimeter.

In at least one embodiment of the adaptive catalytic technology water treatment system, the third stage ACT water treatment utilizes UVC-PhotoCatalystAlpha/Peroxide (Module 3) advanced oxidation process to reduce low level of organic carbon compounds to non-hazardous compounds, such as, carbon dioxide and water, or simpler compounds that are less toxic, depending on the stability and complexity of the organic contaminants. The UVC-PhotoCatalystAlpha/Peroxide treatment step produces hydroxyl radicals, a powerful oxidizer that reacts with the organic carbon compounds in the water without generating DBPs. DBPs are generated from reactions between natural organic matters (NOMs) and inexpensive halogenated sanitizers, such as, chlorine gas, chlorine dioxide, hypochlorites, hypochlorous acid, and bromine and brominated compounds. UVC-PhotoCatalystAlpha-Peroxide is superior at reducing organic compounds than UV only, UV-PhotoCatalyst, and UV-Peroxide. The UV radiation disrupts bacteria, micro-organism, and virus but it does not destroy them. Bacteria and virus could repair themselves and thrive once the UVC radiation is removed. UV-PhotoCatalyst produces hydroxyl radicals but not sufficiently to oxidize larger complex and stable compounds. UV-Peroxide requires much higher dosage of peroxide than a UVC-PhotoCatalystAlpha/Peroxide in this process. The efficacy the UVC-PhotoCatalystAlpha/Peroxide catalyst to reduce organic compounds is further increased with the addition of hydrogen peroxide; and wherein commercially available hydrogen peroxide solution may be used or supplied in-situ using a commercial hydrogen peroxide generator.

In at least one embodiment, the adaptive catalytic technology water treatment system further includes in the third stage the PhotoCatalystAlpha used in this present invention in the form of a fixed bed catalyst. PhotoCatalystAlpha can be affixed chemically or mechanically onto a solid substrate that can be of any shapes or dimensions, such as, spheres, cylinders, cubes, rings, sheet, et cetera.

In at least one embodiment, the adaptive catalytic technology water treatment system further includes in the third stage the step wherein the PhotoCatalystAlpha comprises of a proprietary catalyst containing one or more of the following: Oxide of Bismuth [Bismuth (III) Oxide ($Bi_2O_3$)], Oxides of Copper [Copper (I) Oxide ($Cu_2O$) and Copper (II) Oxide (CuO)], Oxide of Platinum [Platinum IV) Oxide ($PtO_2$)], Oxides of Silver [Silver Oxide (AgO), Silver (I) Oxide ($Ag_2O$) and Silver (III) Oxide ($Ag_2O_3$)], Oxide of Titanium [Titanium (IV) Oxide ($TiO_2$)], Oxides of Tin [Tin (II) Oxide (SnO), Tin (IV) Oxide ($SnO_2$)], Oxides of Tungsten [Tungsten (III) Oxide ($W_2O_3$), Tungsten (IV) Oxide ($WO_2$), Tungsten (VI) Oxide ($WO_3$) and Tungsten Peroxide ($W_2O_5$)], and/or Oxide of Zinc [Zinc Oxide (ZnO)]. The concentrations of these metal oxides may vary from trace ppm levels to 100%. Any combination of these metal oxides may be used. The metal oxides can be affixed to a substrate as nano (1-100 nanometer) or micron (greater than 100 nanometer) particles, or as heterogeneous solids.

In at least one embodiment of the adaptive catalytic technology water treatment system, the fourth stage of the ACT water treatment utilizes a pre-treated water that improve the efficiency of a commercially available ion-exchange resin bed designed to remove heavy metals (Module 4).

In at least one embodiment, the adaptive catalytic technology water treatment system further includes in the fourth stage pre-treating the incoming water to reduce or eliminate the organic compound contaminants, removing microorganisms, and inactivating bacteria and viruses, therefore, fouling due to biofilm is further minimized, thereby increasing the surface area available for ion-exchange and removal of the heavy metals.

In at least one embodiment, the adaptive catalytic technology water treatment system further includes in the fourth stage reducing the water hardness through electrochemical deposition and crystallization of $CaCO_3$ onto the Catalyst-Gamma (Module 2), the life of the ion-exchange resin bed is extended.

In at least one embodiment of the adaptive catalytic technology water treatment system, the fifth stage of the ACT water treatment utilizes UVA-PhotoCatalystBeta to sanitize the water. Unlike UVC (100-280 nm wavelength), which is produced by a mercury lamp, the UVA (315-400 nm wavelength) uses LED technology that is more energy efficient. The UVA-PhotoCatalystAlpha treatment step produces hydroxyl radicals, a powerful oxidizer that attacks and destroy bacteria, micro-organism and virus, and not just disrupt them. The PhotoCatalystBeta can be affixed chemically or mechanically onto a solid substrate that can be of any shapes or dimensions, such as, spheres, cylinders, rings, sheet, et cetera. The PhotoCatalystBeta in the ACT water treatment invention is used as a fixed bed catalyst.

In at least one embodiment, the adaptive catalytic technology water treatment system further includes in the fifth stage the step wherein the PhotoCatalystBeta of the ACT water treatment comprises of a proprietary catalyst containing one or more of the following: Oxide of Bismuth [Bismuth (III) Oxide ($Bi_2O_3$)]; Oxides of Copper [Copper (I) Oxide ($Cu_2O$) and Copper (II) Oxide (CuO)]; Oxide of Platinum [Platinum (IV) Oxide ($PtO_2$)]; Oxides of Silver [Silver Oxide (AgO), Silver (I) Oxide ($Ag_2O$), and Silver (III) Oxide ($Ag_2O_3$)]; Oxide of Titanium [Titanium (IV) Oxide ($TiO_2$)]; Oxides of Tin [Tin (II) Oxide (SnO), Tin (IV) Oxide ($SnO_2$)]; Oxides of Tungsten [Tungsten (III) Oxide ($W_2O_3$), Tungsten (IV) Oxide ($WO_2$), Tungsten (VI) Oxide ($WO_3$), and Tungsten Peroxide ($W_2O_5$)]; and/or Oxide of Zinc [Zinc Oxide (ZnO)]. The concentrations of these metal oxides may vary from trace ppm levels to 100%. Any combinations of these metal oxides may be used. The metal oxides can be affixed to a substrate as nano (1-100 nanometer) or micron (greater than 100 nanometer) particles, or as heterogeneous solids.

In at least one embodiment of the adaptive catalytic technology water treatment system, the sixth stage of the ACT water treatment can all be selected or used in any combination to treat the contaminants of the incoming pre-filter water. For example, in urban areas where suspended solids and organic carbon are not an issue, but there may be concern over heavy metals, Modules 1 and 3 can be left out. In areas where the reliability of water quality is in question, all six modules can be employed. The ACT water treatment is designed for pre-filtered drinking water with trace contaminates for a wide range of water quality, not designed to treat sanitary waste water, industrial waste water, or heavily contaminated organic laden water.

In at least one embodiment of the adaptive catalytic technology water treatment system, the system includes the step wherein the ACT water treatment may be equipped with various analyzers (e.g., conductivity, density, dissolved oxygen, flow, oxidation reduction potential (ORP), pH, temperature, turbidity meter), instrumentation (e.g., proximity, magnetic switch, counter, timer), data recorder, programmable logic controller (PLC), and human machine interface (HMI).

In at least one embodiment of the adaptive catalytic technology water treatment system, the system includes the step wherein the ACT water treatment can be designed as a gravity flow, atmospheric water treatment system, or as a pressurized system.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the technology described herein. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In the following description of this ACT water treatment invention, specific details are set forth in order to provide a thorough understanding of this ACT water treatment invention. On the one hand, it is understood that those who are skilled in the art may practice this ACT water treatment invention without these specific details. On the other hand, well-known methods, procedures, and components have not been described in detail so as not to obscure this ACT water treatment invention.

TABLE 1

GRAVITY FLOW WATER TREATMENT

| NO | NAME |
|---|---|
| 01 | Suspended Solid Removal (SS) Module 1 |
| 02 | Hardness Reduction Module 2 |
| 03 | Total Organic Carbon (TOC) Removal Module 3 |
| 04 | Heavy Metal Removal Module 4 |
| 05 | Sanitization Module 5 |
| 06 | Ultra-sound Rapid Mix Aeration Module 6 |
| 07 | Instrumentation & Electrical Control |
| 08 | Pump |
| 09 | Ballast |
| 10 | Lid |
| 11 | Hydrogen Peroxide Storage |
| 12 | Power Socket |
| 13 | Sanitized Water |
| 14 | Dispenser Valve |
| 15 | Section I - Incoming Water Storage & Pre-treatment Chamber |

TABLE 1-continued

GRAVITY FLOW WATER TREATMENT

| NO | NAME |
|---|---|
| 16 | Section II - Primary Treatment, Electrical, & Instrumentation & Control Chamber |
| 17 | Section III - Sanitary Water Storage & Rapid Mix Aeration Chamber |
| 18 | Seals |
| 19 | Base |

TABLE 2

MODULE 1 - SUSPEND SOLID FILTRATION & HARDNESS TREATMENT

| NO | NAME |
|---|---|
| 01 | Cap |
| 02 | Cap |
| 03 | Gasket |
| 04 | Ceramic Composite |
| 05 | Gasket |
| 06 | Sensor |
| 07 | Cap |
| 08 | Screw, Gasket, & Wingnut Assembly |
| 09 | Outlet Nozzle |
| 10 | Opening Notch |
| 11 | Cap |

TABLE 3

MODULE 2 - HARDNESS REDUCTION

| NO | NAME |
|---|---|
| 01 | Cap |
| 02 | Electrical Socket |
| 03 | Gasket |
| 04 | Support Screen |
| 05 | Copper Core |
| 06 | CatalystGamma Anode |
| 07 | CatalystGamma Cathode |
| 08 | Gasket |
| 09 | Sensor |
| 10 | Cap |
| 11 | Screw, Gasket, & Wingnut Assembly |
| 12 | Cap |
| 13 | Electrical Wiring |
| 14 | Perforated Metal Screen |

TABLE 4

MODULE 3 - TOTAL ORGANIC CARBON (TOC) REMOVAL

| NO | NAME |
|---|---|
| 01 | Cap |
| 02 | Inlet Nozzle |
| 03 | Electrical Socket |
| 04 | Gasket |
| 05 | Support Screen |
| 06 | UVC Mercury Lamp |
| 07 | Quartz Housing |
| 08 | PhotoCatalystAlpha |
| 09 | Retainer |
| 10 | Support Screen |
| 11 | Gasket |
| 12 | Sensor |
| 13 | Cap |
| 14 | Outlet Nozzle |
| 15 | Opening Notch |

TABLE 4-continued

MODULE 3 - TOTAL ORGANIC CARBON (TOC) REMOVAL

| NO | NAME |
|---|---|
| 16 | Electrical Wiring |
| 17 | Housing |

TABLE 5

MODULE 4 - HEAVY METAL REMOVAL

| NO | NAME |
|---|---|
| 01 | Cap |
| 02 | Inlet Nozzle |
| 03 | Cap |
| 04 | Gasket |
| 05 | Support Screen |
| 06 | Ion Exchange Resin Bed |
| 07 | Support Screen |
| 08 | Membrane Filter |
| 09 | Gasket |
| 10 | Sensor |
| 11 | Cap |
| 12 | Outlet Nozzle |
| 13 | Opening Notch |
| 14 | Housing |

TABLE 6

MODULE 5 - SANITIZATION

| NO | NAME |
|---|---|
| 01 | Cap |
| 02 | Inlet Nozzle |
| 03 | Electrical Socket |
| 04 | Gasket |
| 05 | Support Screen |
| 06 | UVA Led Lamp |
| 07 | Quartz Housing |
| 08 | Photo Catalyst Beta |
| 09 | Retainer |
| 10 | Housing |
| 11 | Gasket |
| 12 | Sensor |
| 13 | Cap |
| 14 | Outlet Nozzle |
| 15 | Opening Notch |
| 16 | Electrical Wiring |
| 17 | Housing |

The ACT water treatment of this invention consists of a six stage plug-and-go modular treatment system: 1) Suspended Solid Removal via a composite filter (FIG. 1-1); 2) Hardness Reduction via electrochemical deposition and crystallization of $CaCO_3$ onto CatalystGamma electrodes (FIG. 1-2); 3) Total Organic Carbon (TOC) removal via UVC-PhotoCatalystAlpha-Peroxide (FIG. 1-3); 4) Heavy Metal Removal via Ion-exchange (FIG. 1-4); 5) Sanitization via UVA-PhotoCatalystBeta (FIGS. 1-5); and 6) Ultra-Sound Rapid Mix Aeration (FIG. 1-6). The six modules of the ACT water treatment are divided into three sections: Section I—Incoming Water Storage & Pre-Treatment Chamber, Section II—Primary Treatment, Electrical, and Instrumentation & Control Chamber, and Section III—Sanitary Water Storage & Rapid Mix Aeration Chamber.

Section I of the ACT water treatment comprises of a water collection chamber (FIG. 1-15), composite filter(s) (FIG. 1-1), electrochemical precipitation module (FIG. 1-2), and an over-the-counter hydrogen peroxide storage (FIG. 1-11).

The first treatment stage of the ACT water treatment utilizes a ceramic-silver composite filter (Module 1), that is designed to remove SS, both inorganic and naturally occurring organic matters (FIG. 1-1). Water flow from the outside into the inner hollow core of the composite filter (FIG. 2-4), and is channeled into Section II (FIG. 1-16). The filter cartridge is designed with a threaded male nipple. It is locked into place by seating the base of the cartridge, over an O-ring, and compressed against the base of the water reservoir through a wing nut (FIG. 2-8). The number of filters is a function of the daily consumption rate and SS loading. The user may install additional a pre-filtration step if the cleaning frequent is too high due to high SS loading. Blanks are used to seal the open, unused slots. The housing rest on top of a seal that seats on top of Section II. Removing the SS enhances the performance of the subsequent stages of the treatment process.

Figure 2:
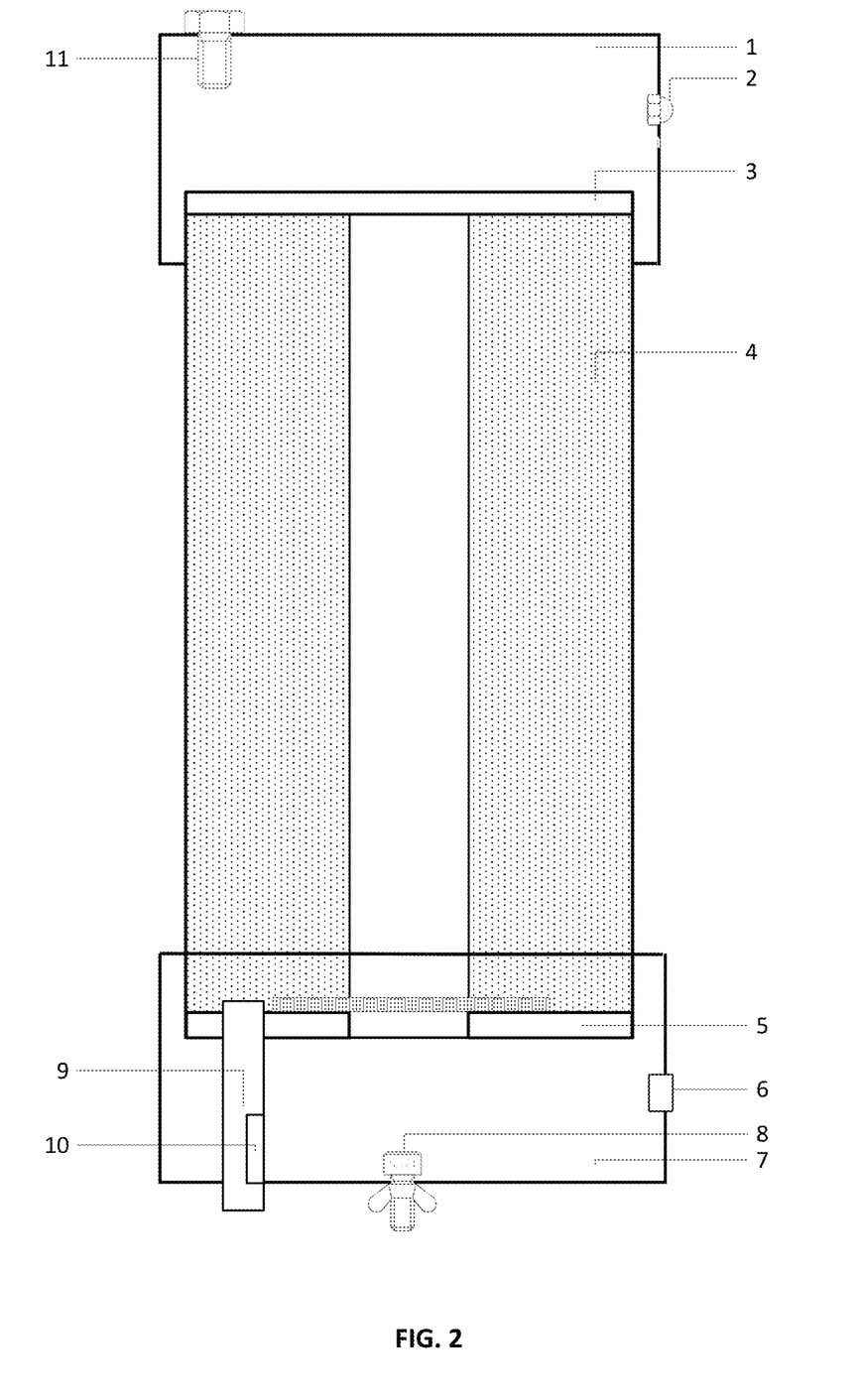
FIG. 2 is a schematic view of a water treatment device, illustrating, in particular, the suspend solid filtration and hardness treatment, according to an embodiment of the technology described herein.

The motive forces for filtration are the hydraulic pressure of the water and the gravitation flow aided by the hydrogen bonding of water molecules themselves; however, a pressurized water source can also be used. The ceramic filter is designed to be removable. The composite filter contains silver, a metal that exhibit natural antimicrobial and antibacterial properties is affixed to the ceramic membrane matrix, serves to minimize fouling and plugging due to biofilm formation. Titanium, zinc, copper, palladium, and platinum may also be used in conjunction with silver in any combinations, concentrations, or particle sizes. Nano particle size is most effective and is preferred; however, micron size or larger particles can also be used. These metals can be in the form of elemental metal, metal oxide, inorganic metal complexes, or organometallic salts. Finally, the composite filter is designed and constructed so that the external layer of the cartridge can be incrementally removed periodically to eliminate media blinding from calcination and/or the accumulation of solids.

Figure 3:
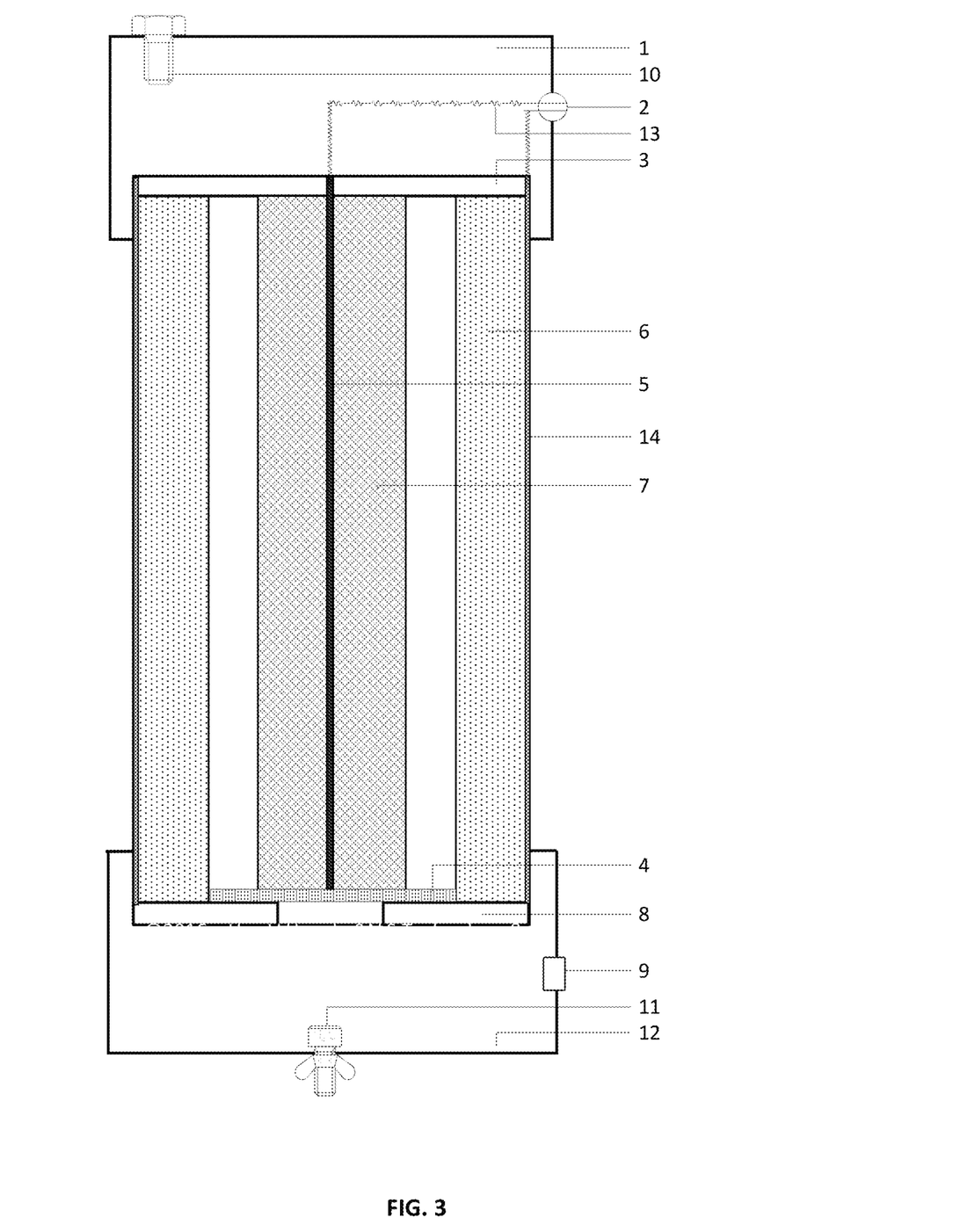
FIG. 3 is a schematic view of a water treatment device, illustrating, in particular, the hardness reduction, according to an embodiment of the technology described herein.
Figure 4:
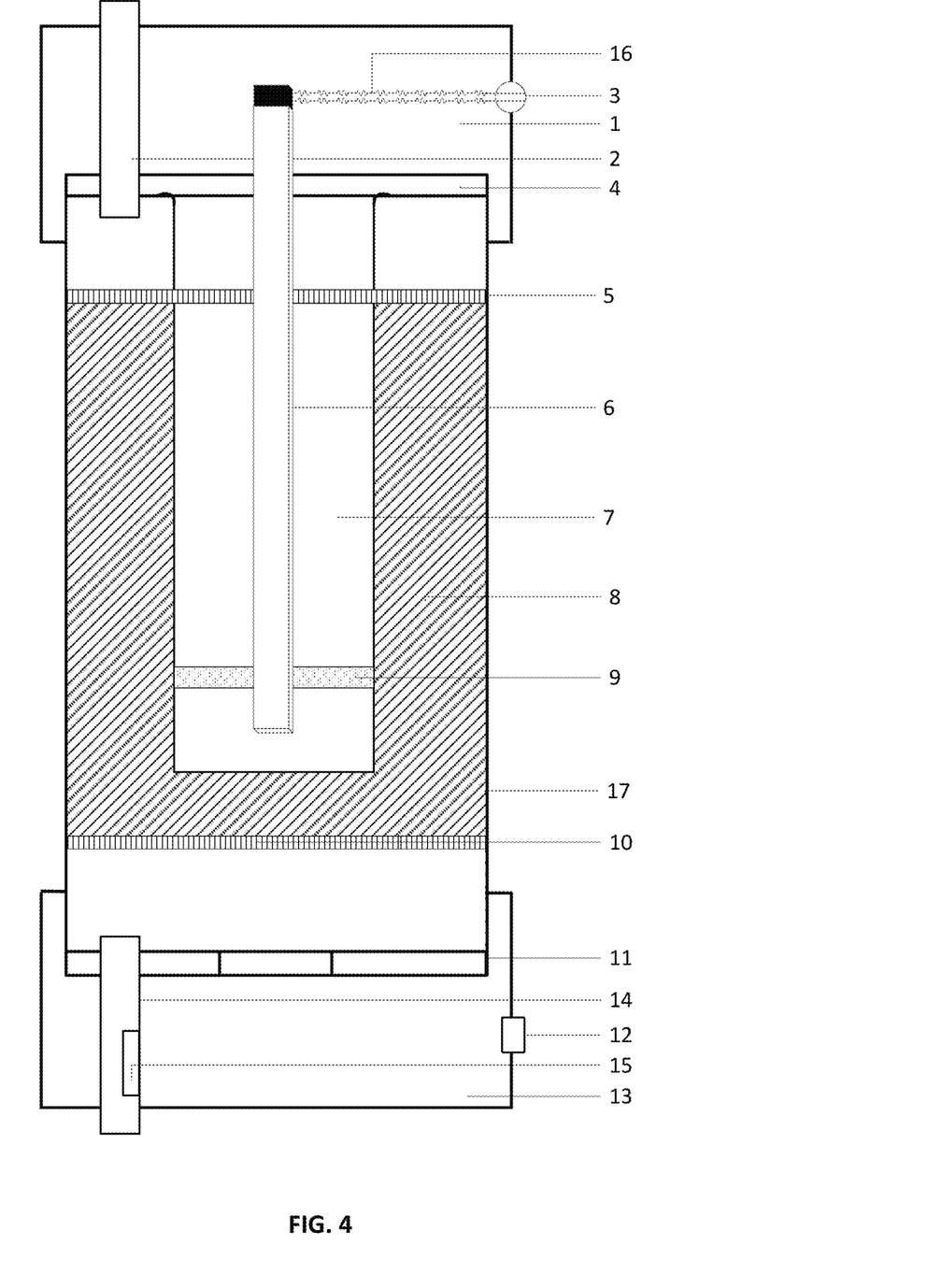
FIG. 4 is a schematic view of a water treatment device, illustrating, in particular, the total organic carbon (TOC) removal, according to an embodiment of the technology described herein.

The second treatment stage of the ACT water treatment utilizes an electrochemical process wherein a reduction of dissolved oxygen in water produces hydroxide ions:

$$O_2 + 2H_2O + 4e^- \rightarrow 4OH^-$$

The hydroxide ions react further, forming $CaCO_3$ on the electrode surface when a current is applied to the cathode:

$$HCO_3^- + OH^- \rightarrow CO_3^{2-} + H_2O$$

$$Ca^{2+} + CO_3^{2-} \rightarrow CaCO_3$$

A CatalystGamma fixed bed are used as the electrodes. The CatalystGamma is a proprietary catalyst comprising of one or more of the following: carbon steel, copper, bronze, stainless steel, platinum, and carbon. The concentrations of these materials may vary from trace ppm levels to 100%. Any combinations of these metal oxides may be used. The metal oxides can be affixed to a substrate as nano (1-100 nanometer) or micron (greater than 100 nanometer) particles, or as heterogeneous solids. The CatalystGamma fixed bed electrode is made by fusing the referenced materials into a composite solid mass by mean of pressure and heat or a binder.

The CatalystGamma anode electrode is in the form of two semi-circular cylinders, which are embedded onto a perforated cylindrical metal screen; they provide rigidity as well as conducting electrons. The CatalystGamma cathode is in the form of cylindrical rod with a conducting metal rod in the center. For a gravitational system, a current is applied when water is detected (e.g., conductivity, mechanical flow switch) in the chamber of Section I. For a pressurized continuous system, a flow sensor may be used.

Reducing water hardness enhances the efficacy of the TOC removal treatment step of UVC-PhotoCatalystAlpha/Peroxide (Module 3) and the Sanitization treatment step of UVA-PhotoCatalystBeta (Module 5) and reduce the ionic metal loading of the ion-exchange resin bed (Module 4) of Section II.

Section II of the ACT water treatment comprises of the main chamber where Modules 3-5 and most all the electrical, instrumentation and control are housed. The Modules 3-5 are designed as cartridges that are inserted into their respective slots in the main chamber. For modules that are not needed, blank cartridges are used in their respective slots so that the water is flown through the rest of the water treatment system. Alternatively, redundant treatment modules can be used. For example, two No. 3 Modules can be used for TOC removal via UVC-PhotoCatalystAlpha/Peroxide if there is a high level of TOC and that the need for heavy metals removal via Ion-exchange is not necessary. Conversely, two No. 4 Modules can be used for heavy metals removal via Ion-exchange type if TOC removal is not needed.

The third stage of the ACT water treatment utilizes a UVC-PhotoCatalystAlpha/Peroxide (Module 3) advanced oxidation process to reduce low level of organic carbon compounds to non-hazardous compounds, such as, carbon dioxide and water, or simpler compounds that are less toxic, depending on the stability and complexity of the organic contaminants. The UVC-PhotoCatalystAlpha/Peroxide treatment step produces hydroxyl radicals, a powerful oxidizer that reacts with the organic carbon compounds in the water without generating DPBs. Over-the-counter hydrogen peroxide is added from the peroxide storage stank of Section I (FIG. 1-11) and is mixed in-line upstream of Module 3. Module 3 may operate without hydrogen peroxide but with lower efficiency. The UV radiation also disrupts bacteria, microorganism and virus, but not destroy them. The PhotoCatalystAlpha used in this present invention in the form of a fixed bed catalyst. The PhotoCatalystBeta of the ACT water treatment comprises of a proprietary catalyst containing one or more of the following: Oxide of Bismuth [Bismuth (III) Oxide ($Bi_2O_3$)], Oxides of Copper [Copper (I) Oxide ($Cu_2O$) and Copper (II) Oxide (CuO)], Oxide of Platinum [Platinum (IV) Oxide ($PtO_2$)], Oxides of Silver [Silver Oxide (AgO), Silver (I) Oxide ($Ag_2O$) and Silver (III) Oxide ($Ag_2O_3$)], Oxide of Titanium [Titanium (IV) Oxide ($TiO_2$)], Oxides of Tin [Tin (II) Oxide (SnO), Tin (IV) Oxide ($SnO_2$)], Oxides of Tungsten [Tungsten (III) Oxide ($W_2O_3$), Tungsten (IV) Oxide ($WO_2$), Tungsten (VI) Oxide ($WO_3$) and Tungsten Peroxide ($W_2O_5$)], and/or Oxide of Zinc [Zinc Oxide (ZnO)]. The concentrations of these metal oxides may vary from trace ppm levels to 100%. Any combinations of these metal oxides may be used. The metal oxides are affixed to a substrate as nano (1-100 nanometer) or micron (greater than 100 nanometer) particles, or as heterogeneous solids. The PhotoCatalystAlpha is coated with a thin film of light or heat sensitive adhesive. The metal oxides are added and fixed in placed by activating the adhesive using either heat or light. The catalyst is washed and dried to remove excess metal oxides.

Figure 5:
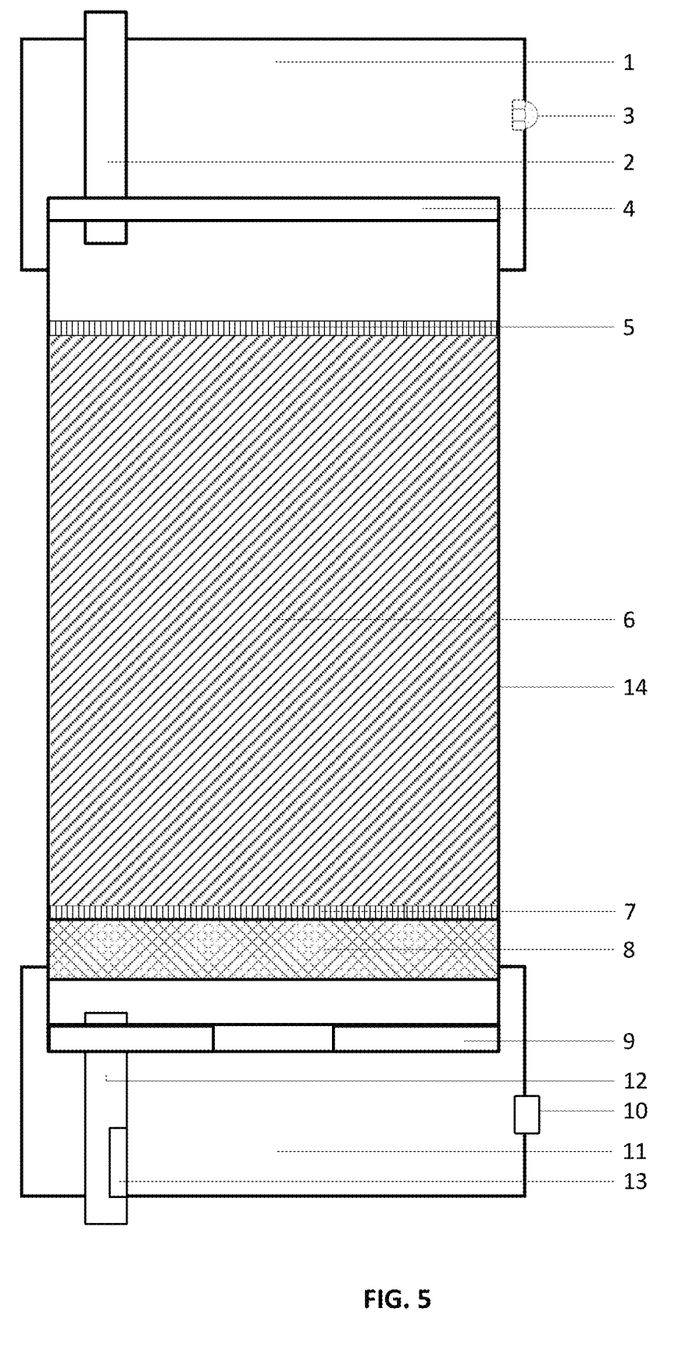
FIG. 5 is a schematic view of a water treatment device, illustrating, in particular, the heavy metal removal, according to an embodiment of the technology described herein.

The fourth stage of the ACT water treatment utilizes a pre-treated water that improve the efficiency of a commercially available ion-exchange resin bed designed to remove heavy metals (Module 4). By pre-treating the incoming water to reduce or eliminate the organic compound contaminants, removing microorganisms, and inactivating bacteria and viruses, fouling due to biofilm is further minimized, thereby increasing the surface area available for ion-exchange and removal of the heavy metals. In addition, by pre-treating the incoming water to reduce water hardness through the precipitation of calcium via electrochemical reaction, the life of the ion-exchange resin bed is extended.

Figure 6:
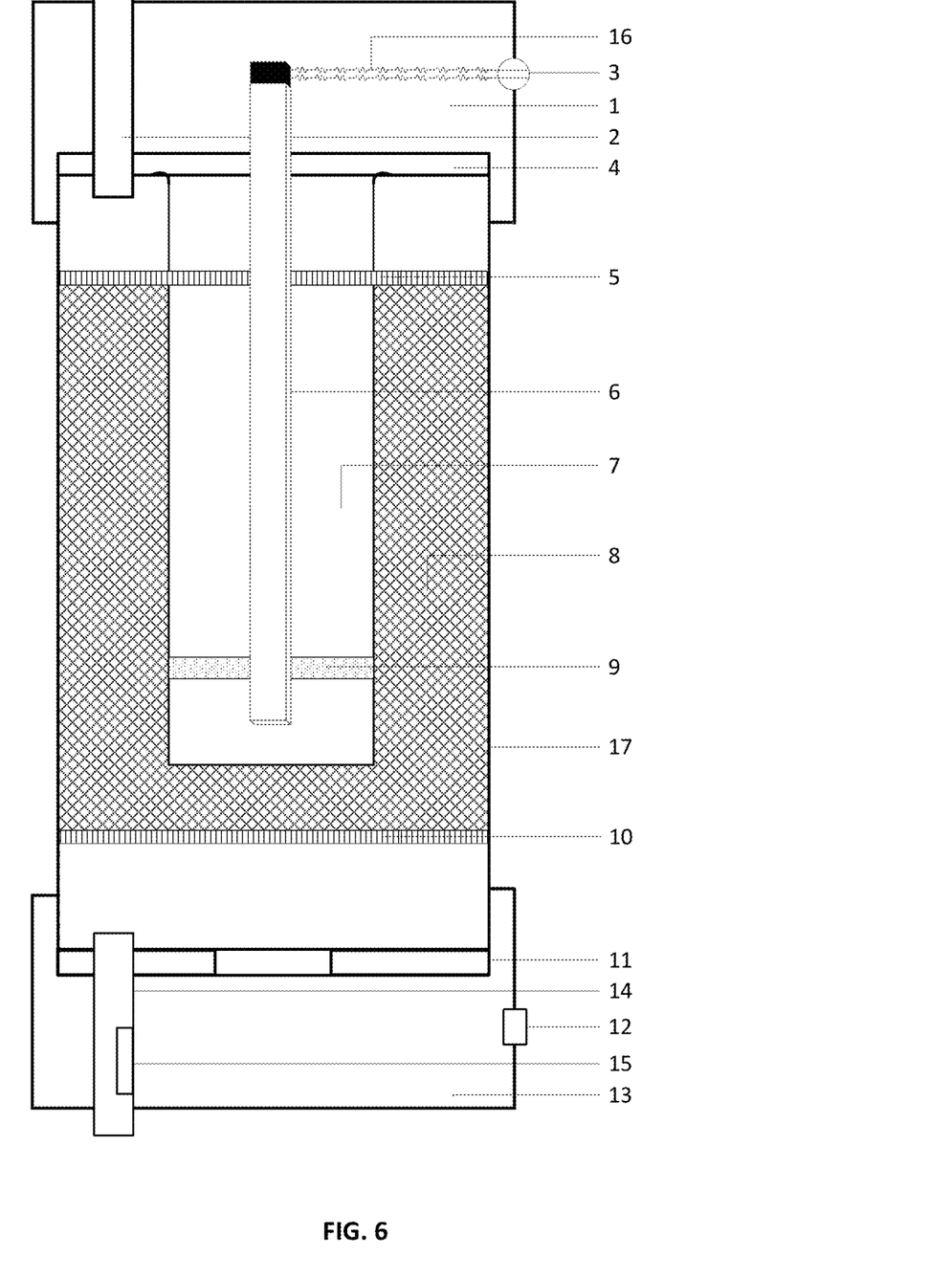
FIG. 6 is a schematic view of a water treatment device, illustrating, in particular, the sanitization, according to an embodiment of the technology described herein.

The fifth stage of the ACT water treatment utilizes UVA-PhotoCatalystBeta to sanitize the water. Unlike UVC (100-280 nm wavelength), which is produced by a mercury lamp, the UVA (315-400 nm wavelength) uses LED technology that is much more energy efficient. The UVA-PhotoCatalystAlpha treatment step destroys bacteria, micro-organism and virus, and not just disrupting them. The PhotoCatalystBeta can be affixed chemically or mechanically onto a solid substrate, which can be of any shapes or dimensions, such as, spheres, cylinders, rings, sheet, et cetera. The PhotoCatalystBeta in the ACT water treatment invention employs a fixed bed catalyst comprises of spheres. The PhotoCatalystBeta of the ACT water treatment comprises of a proprietary catalyst containing one or more of the following: Oxide of Bismuth [Bismuth (III) Oxide ($Bi_2O_3$)], Oxides of Copper [Copper (I) Oxide ($Cu_2O$) and Copper (II) Oxide (CuO)], Oxide of Platinum [Platinum (IV) Oxide ($PtO_2$)], Oxides of Silver [Silver Oxide (AgO), Silver (I) Oxide ($Ag_2O$) and Silver (III) Oxide ($Ag_2O_3$)], Oxide of Titanium [Titanium (IV) Oxide ($TiO_2$)], Oxides of Tin [Tin (II) Oxide (SnO), Tin (IV) Oxide ($SnO_2$)], Oxides of Tungsten [Tungsten (III) Oxide ($W_2O_3$), Tungsten (IV) Oxide ($WO_2$), Tungsten (VI) Oxide ($WO_3$) and Tungsten Peroxide ($W_2O_5$)], and/or Oxide of Zinc [Zinc Oxide (ZnO)]. The concentrations of these metal oxides may vary from trace ppm levels to 100%. Any combinations of these metal oxides may be used. The metal oxides can be affixed to a substrate as nano (1-100 nanometer) or micron (greater than 100 nanometer) particles, or as heterogeneous solids. The PhotoCatalystBeta is coated with a thin film of light or heat sensitive adhesive. The metal oxide or metal oxides are added and fixed in placed by the activating the adhesive using either heat or light. The catalyst is washed and dried to remove excess metal oxides.

Section III of the ACT water treatment comprises of a sanitary water collection chamber (FIG. 1-13), ultra-sound air mixing chamber (FIG. 1-6), and a water dispensing valve (FIG. 1-5). The fifth stage of the ACT water treatment utilizes a storage sanitary storage vessel that is designed to recirculate the storage water back through Module 5 if the water is not used for a given amount of time. The chamber is darken to minimize biological activities. In addition, the water dispenser is equipped with an ultrasonic air diffuser to add effervescence and to improve the taste of the water (Module 6) since pure de-ionized water is tasteless, and water without traces of dissolved minerals and gases tastes stale to the pallet. An ultrasound air diffuser is mounted up-steam of the water dispensing valve. When the valve (FIG. 1-14) is opened, a sensor activates the ultrasound diffuser, rapidly mixing oxygen in the water diffuser to add effervescence and improve the taste of the water. $CO_2$ gas, in placed of air, may also be used to dispense carbonated water.

Finally, depending on the quality of the incoming water and point of use requirements, the ACT water treatment may be fully equipped with various analyzers (e.g., conductivity, density, dissolved oxygen, flow, ORP, pH, temperature, turbidity meter), instrumentation (e.g., proximity, magnetic switch, counter, timer), data recorder, PLC, and display panel for a fully automated, pressurized system; or operate as an atmospheric water treatment system with rudimentary electrical, instrument, and control.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology described herein and are intended to be covered by the following claims.

What is claimed is:

1. An Adaptive Catalytic Technology ("ACT") water treatment six-stage plug-and-go modular treatment system comprising:
   a. a Suspended Solid (SS) Removal via filtration first stage;
   b. a Hardness Reduction via electrochemical deposition and crystallization of $CaCO_3$ second stage;
   c. a Total Organic Carbon (TOC) Removal via UVC-PhotoCatalystAlpha/Peroxide third stage;
   d. a Heavy Metal Removal via ion-exchange fourth stage;
   e. a Sanitization via UVA-PhotoCatalystBeta fifth stage; and
   f. a Ultra-sound Rapid Mix Aeration sixth stage.

2. The water treatment system of claim 1, wherein the first stage of the ACT water treatment comprises:
   a removable ceramic-silver composite filter, configured to remove suspended solids (SS) of both inorganic and naturally occurring organic matters, thereby to enhance performance of the subsequent stages, and wherein the motive forces for filtration are the hydraulic pressure of the water and the gravitation flow aided by the hydrogen bonding of water molecules themselves or a pressurized water source.

3. The water treatment system of claim 2, further comprising:
   a composite filter that contains silver, a metal that exhibits natural antimicrobial and antibacterial properties, and used to minimize fouling and plugging due to biofilm formation, affixed to a ceramic membrane matrix.

4. The water treatment system of claim 2, wherein the composite filter is designed and constructed so that an external layer of a cartridge can be incrementally removed periodically to eliminate media blinding from calcination and/or the accumulation of solids.

5. The water treatment system of claim 1, wherein the second stage of the ACT water treatment further comprises:
   an electrochemical treatment stage to remove hardness from the water, thus enhancing the efficacy of the TOC removal treatment stage of UVC-PhotoCatalystAlpha/Peroxide and the Sanitization treatment stage of UVA-PhotoCatalystBeta, and reduce an ionic metal loading of an ion-exchange resin bed.

6. The water treatment system of claim 5, wherein the second stage of the ACT water treatment further comprises:
   a means to remove calcium ions from the water through electrochemical deposition and crystallization of calcium carbonate ($CaCO_3$) onto the surface of CatalystGamma fixed bed electrodes when a current is applied;
   wherein the CatalystGamma fixed bed electrode comprises a proprietary catalyst containing one or more of the following: carbon steel, copper, bronze, stainless steel, and platinum;
   wherein the concentrations of these materials may vary from trace ppm levels to 100%;
   wherein combinations of these metal oxides may be used;
   wherein, the metal oxides can be affixed to a substrate as nano (1-100 nanometer) or micron (greater than 100 nanometer) particles, or as heterogeneous solids;
   wherein the CatalystGamma fixed bed electrode is made by fusing the referenced materials into a composite solid mass by mean of pressure and heat or an inert binder;
   wherein the electrodes can be of any shapes or sizes;
   wherein the electrodes can be a pair of anode and cathode or multiple pairs; and
   wherein the gap between electrodes can vary between 100 micron and 100 millimeter.

7. The water treatment system of claim 1, wherein the third stage of the ACT water treatment further comprises:
   a UVC-PhotoCatalystAlpha/Peroxide advanced oxidation to reduce low level of organic carbon compounds to non-hazardous compounds, such as, carbon dioxide and water, or simpler compounds that are less toxic, depending on the stability and complexity of one or more organic contaminants;
   wherein the UVC-PhotoCatalystAlpha/Peroxide oxidation produces hydroxyl radicals, a powerful oxidizer that reacts with the organic carbon compounds in the water without generating DBPs;
   wherein DBPs are generated from reactions between natural organic matters (NOMs) and inexpensive halogenated sanitizers, such as, chlorine gas, chlorine dioxide, hypochlorites, hypochlorous acid, and bromine and brominated compounds;
   wherein UVC-PhotoCatalystAlpha-Peroxide is superior at reducing organic compounds than UV only, UV-PhotoCatalyst, and UV-Peroxide;
   wherein a UVC radiation disrupts bacteria, micro-organism, and virus but it does not destroy them;
   wherein bacteria and virus could repair themselves and thrive once the UVC radiation is removed;
   wherein UV-PhotoCatalyst produces hydroxyl radicals but not sufficiently to oxidize larger complex and stable compounds;
   wherein UV-Peroxide requires much higher dosage of peroxide than a UVC-PhotoCatalystAlpha/Peroxide in this process;
   wherein the efficacy the UVC-PhotoCatalystAlpha/Peroxide catalyst to reduce organic compounds is further increased with the addition of hydrogen peroxide; and wherein commercially available hydrogen peroxide solution may be used or supplied in-situ using a commercial hydrogen peroxide generator.

8. The water treatment system of claim 7 wherein the PhotoCatalystAlpha comprises a fixed bed catalyst; and wherein the PhotoCatalystAlpha can be affixed chemically or mechanically onto a solid substrate that can be of any shapes or dimensions to include spheres, cylinders, cubes, rings, and sheets.

9. The water treatment system of claim 7, wherein the PhotoCatalystAlpha comprises a proprietary catalyst containing one or more of the following: Oxide of Bismuth [Bismuth (III) Oxide ($Bi_2O_3$)], Oxides of Copper [Copper (I) Oxide ($Cu_2O$) and Copper (II) Oxide (CuO)], Oxide of Platinum [Platinum (IV) Oxide ($PtO_2$)], Oxides of Silver [Silver Oxide (AgO), Silver (I) Oxide ($Ag_2O$) and Silver (III) Oxide ($Ag_2O_3$)], Oxide of Titanium [Titanium (IV) Oxide ($TiO_2$)], Oxides of Tin [Tin (II) Oxide (SnO), Tin (IV) Oxide ($SnO_2$)], Oxides of Tungsten [Tungsten (III) Oxide ($W_2O_3$), Tungsten (IV) Oxide ($WO_2$), Tungsten (VI) Oxide ($WO_3$) and Tungsten Peroxide ($W_2O_5$)], and/or Oxide of Zinc [Zinc Oxide (ZnO)]; wherein the concentrations of these metal oxides may vary from trace ppm levels to 100%; wherein any combination of these metal oxides may be used; wherein the metal oxides can be affixed to a substrate as nano (1-100 nanometer) or micron (greater than 100 nanometer) particles, or as heterogeneous solids.

10. The water treatment system of claim 1 wherein the fourth stage of the ACT water treatment further comprises:
   a pre-treated water that improves the efficiency of a commercially available ion-exchange resin bed designed to remove heavy metals.

11. The water treatment system of claim 10 wherein the incoming water is pretreated to reduce or eliminate one or more organic compound contaminants, remove microorganisms, and inactivate bacteria and viruses, therefore, fouling due to biofilm is further minimized, thereby increasing the surface area available for ion-exchange and removal of the heavy metals.

12. The water treatment system of claim 10 wherein the water hardness is reduced through electrochemical deposition and crystallization of $CaCO_3$ onto a CatalystGamma, the life of the ion-exchange resin bed is extended.

13. The water treatment system of claim 1 wherein the fifth stage of the ACT water treatment further comprises:
   a UVA-PhotoCatalystBeta to sanitize the water;
   wherein unlike UVC (100-280 nm wavelength), which is produced by a mercury lamp, the UVA (315-400 nm wavelength) uses LED technology that is more energy efficient;
   wherein a UVA-PhotoCatalystAlpha produces hydroxyl radicals, a powerful oxidizer that attacks and destroy bacteria, micro-organism and virus, and not just disrupt them;
   wherein the UVA-PhotoCatalystBeta can be affixed chemically or mechanically onto a solid substrate that can be of any shapes or dimensions, including spheres, cylinders, rings, and sheets; and
   wherein the UVA-PhotoCatalystBeta in the ACT water treatment is used as a fixed bed catalyst.

14. The water treatment system of claim 13, wherein the UVA-PhotoCatalystBeta of the ACT water treatment comprises of a proprietary catalyst containing one or more of the following: Oxide of Bismuth [Bismuth (III) Oxide ($Bi2O_3$)]; Oxides of Copper [Copper (I) Oxide ($Cu_2O$) and Copper (II) Oxide (CuO)]; Oxide of Platinum [Platinum IV) Oxide ($PtO_2$)]; Oxides of Silver [Silver Oxide (AgO), Silver (I) Oxide ($Ag_2O$), and Silver (III) Oxide ($Ag_2O_3$)]; Oxide of Titanium [Titanium (IV) Oxide ($TiO_2$)]; Oxides of Tin [Tin (II) Oxide (SnO), Tin (IV) Oxide ($SnO_2$)]; Oxides of Tungsten [Tungsten (III) Oxide ($W_2O_3$), Tungsten (IV) Oxide ($WO_2$), Tungsten (VI) Oxide ($WO_3$), and Tungsten Peroxide ($W_2O_5$)]; and/or Oxide of Zinc [Zinc Oxide (ZnO)]; wherein the concentrations of these metal oxides may vary from trace ppm levels to 100%; wherein any combinations of these metal oxides may be used; and wherein the metal oxides can be affixed to a substrate as nano (1-100 nanometer) or micron (greater than 100 nanometer) particles, or as heterogeneous solids.

15. The water treatment system of claim 1 wherein the stages of the ACT water treatment are removable and interchangeable and not all stages are required; and wherein the six stages can all be selected or used in any combination to treat one or more contaminants of the incoming pre-filter water.

16. The water treatment system of claim 1, further comprising:
   one or more analyzers (e.g., conductivity, density, dissolved oxygen, flow, oxidation reduction potential (ORP), pH, temperature, turbidity meter), instrumentation (e.g., proximity, magnetic switch, counter, timer), data recorder, programmable logic controller (PLC), and human machine interface (HMI).

17. The water treatment system of claim 1, wherein the ACT water treatment comprises a gravity flow, an atmospheric water treatment system, or a pressurized system.

* * * * *